United States Patent
Jakupca et al.

(10) Patent No.: US 11,780,977 B2
(45) Date of Patent: Oct. 10, 2023

(54) POLYMER COMPOSITIONS HAVING AN IMPROVED PRINTABLE SURFACE AND RELATED METHODS

(71) Applicant: Dover Chemical Corporation, Dover, OH (US)

(72) Inventors: Michael Jakupca, Canton, OH (US); John Regula, Baltic, OH (US); Jacob Lance, Dover, OH (US)

(*) Notice: Subject to any disclaimer, the term of this patent is extended or adjusted under 35 U.S.C. 154(b) by 29 days.

(21) Appl. No.: 17/398,540

(22) Filed: Aug. 10, 2021

(65) Prior Publication Data

US 2022/0041822 A1 Feb. 10, 2022

Related U.S. Application Data

(60) Provisional application No. 63/063,534, filed on Aug. 10, 2020.

(51) Int. Cl.
| | |
|---|---|
| *C08J 5/18* | (2006.01) |
| *C08L 23/30* | (2006.01) |
| *C08J 7/04* | (2020.01) |

(52) U.S. Cl.
CPC .............. *C08J 5/18* (2013.01); *C08J 7/0427* (2020.01); *C08L 23/30* (2013.01); *C08J 2323/30* (2013.01); *C08J 2443/02* (2013.01); *C08L 2203/16* (2013.01)

(58) Field of Classification Search
USPC ......................................................... 428/461
See application file for complete search history.

(56) References Cited

FOREIGN PATENT DOCUMENTS

CN 106926534 A * 7/2017 ............. B32B 27/08

OTHER PUBLICATIONS

CN-106926534-A machine translation (Year: 2017).*

* cited by examiner

*Primary Examiner* — Terressa Boykin

(57) ABSTRACT

A composition having a polymer-film composition having a compound having the structure:

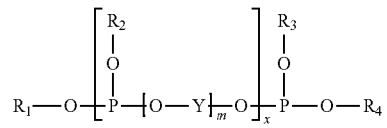

wherein: each R is independently selected; each R is a $C_{1-20}$ alkyl moiety, $C_{2-22}$ alkenyl moiety, $C_{6-40}$ cycloalkyl moiety, $C_{6-40}$ cycloalkylene moiety, $C_{2-20}$ alkyl glycol ether moiety, $C_{10}$-$C_{16}$ linear alkyl alcohol moiety, or Y—OH moiety; each Y is a $C_{2-40}$ alkylene moiety, $C_{6-40}$ cycloalkylene moiety, $C_{2-20}$ alkylene glycol ether, or a $C_{3-40}$ alkylene lactone; m is an integer ranging from 1 to 100; x is an integer ranging from 2 to 1,000; and the polymer-film composition having an oxidized polymer-film surface.

10 Claims, 4 Drawing Sheets

POLYMER COMPOSITIONS HAVING AN IMPROVED PRINTABLE SURFACE AND RELATED METHODS

CROSS-REFERENCE TO RELATED APPLICATIONS

This non-provisional patent application claims priority to U.S. provisional patent application 63/063,534 titled "Dyne Retention," having a filing date of Aug. 10, 2020. The provisional-patent-application subject matter is incorporated by reference into this application.

BACKGROUND OF THE INVENTION

Polymer films and articles are used extensively for packaging applications, including food packaging. One drawback to many polymer films is that they tend to have a very low surface energy, making them difficult for polar substances, like ink, to adhere to. A variety of treatments are known in the art to increase the surface energy of polymer films—so that ink and other surface treatments may be applied to a film's surface. Several techniques are commonly used to increase the surface energy of a film including corona treatment, plasma treatment, and flame treatment. These processes oxidize the surface of the film to form polar groups which increases the surface energy and allows for better adhesion of the ink. These surface treatments also improve adhesion of other materials, such as aluminum, which is often applied to polypropylene films to improve the vapor barrier properties of the material for food packaging. This is especially important for foods that are sensitive to moisture—such as potato chips.

It is known in the art that over a certain period of time, after treating the surface of the polymer, this treatment will begin to wear off and the surface energy will revert to the starting surface energy of the polymer. This means that the polymer may need to be treated an additional time if stored too long before printing.

Antioxidants are added into almost all types of polymers and are critical to prevent thermo-oxidative degradation of the polymer during processing and post processing. These additives are essential for maintaining important polymer properties such as melt flow index and color. However, these additives have the potential to negatively impact these surface-energy treatments and can accelerate the process of the polymer reverting to its original or untreated surface energy level.

There remains a need for improving the longevity of a polymer film's increased surface energy while also using antioxidants in the polymer film.

BRIEF SUMMARY OF THE INVENTION

A composition having a polymer-film composition having a compound having the structure:

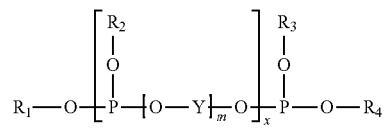

wherein: each R is independently selected; each R is a $C_{1-20}$ alkyl moiety, $C_{2-22}$ alkenyl moiety, $C_{6-40}$ cycloalkyl moiety, $C_{6-40}$ cycloalkylene moiety, $C_{2-20}$ alkyl glycol ether moiety, $C_{10}$-$C_{16}$ linear alkyl alcohol moiety, or Y—OH moiety; each Y is a $C_{2-40}$ alkylene moiety, $C_{6-40}$ cycloalkylene moiety, $C_{2-20}$ alkylene glycol ether, or a $C_{3-40}$ alkylene lactone; m is an integer ranging from 1 to 100; x is an integer ranging from 2 to 1,000; and the polymer-film composition having an oxidized polymer-film surface.

A polymer film composition having a polymer film composition having a compound having the structure:

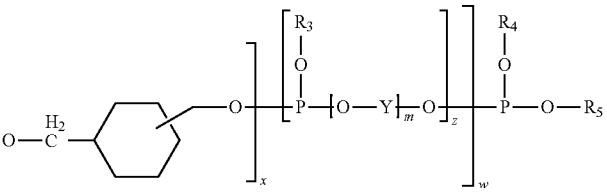

wherein: each R is independently selected; each R is a $C_{1-20}$ alkyl moiety, $C_{2-22}$ alkenyl moiety, $C_{6-40}$ cycloalkyl moiety, $C_{6-40}$ cycloalkylene moiety, $C_{2-20}$ alkyl glycol ether moiety, $C_{10}$-$C_{16}$ linear alkyl alcohol moiety, or Y—OH moiety; each Y is a $C_{2-40}$ alkylene moiety, $C_{2-40}$ alkylene lactone, $C_{6-40}$ cycloalkylene moiety, $C_{2-20}$ alkylene glycol ethers; x is an integer ranging from 1 to 1,000; z is an integer ranging from 0 to 1000; m is an integer ranging from 1 to 20; w is an integer ranging from 1 to 1,000; and the polymer-film composition having an oxidized polymer-film surface.

A composition having a polymer-film composition having a first compound and a second compound, the first compound having the structure:

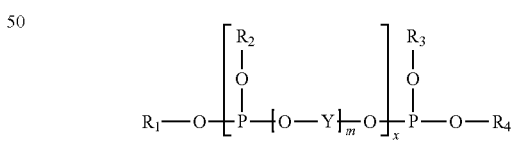

wherein: each R is independently selected; each R is a $C_{1-20}$ alkyl moiety, $C_{2-22}$ alkenyl moiety, $C_{6-40}$ cycloalkyl moiety, $C_{6-40}$ cycloalkylene moiety, $C_{2-20}$ alkyl glycol ether moiety, $C_{10}$-$C_{16}$ linear alkyl alcohol moiety, or Y—OH moiety ; each Y is a $C_{2-40}$ alkylene moiety, $C_{6-40}$ cycloalkylene moiety, $C_{2-20}$ alkylene glycol ether, or $C_{3-40}$ alkylene lactone; m is an integer ranging from 1 to 100; x is an integer ranging from 2 to 1,000; and the second compound having the structure:

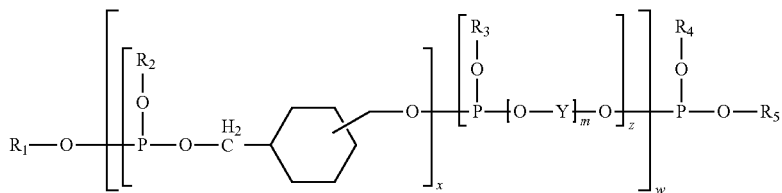

wherein: each R is independently selected; each R is a $C_{1-20}$ alkyl moiety, $C_{2-22}$ alkenyl moiety, $C_{6-40}$ cycloalkyl moiety, $C_{6-40}$ cycloalkylene moiety, $C_{2-20}$ alkyl glycol ether moiety, $C_{10}$-$C_{16}$ linear alkyl alcohol moiety, or Y—OH moiety; each Y is a $C_{2-40}$ alkylene moiety, $C_{2-40}$ alkylene lactone, $C_{6-40}$ cycloalkylene moiety, or $C_{2-20}$ alkylene glycol ether; x is an integer ranging from 1 to 1,000;

z is an integer ranging from 0 to 1000; m is an integer ranging from 1 to 20; w is an integer ranging from 1 to 1,000; and the polymer-film composition having an oxidized polymer-film surface.

DETAILED DESCRIPTION OF THE INVENTION

Figure 1:
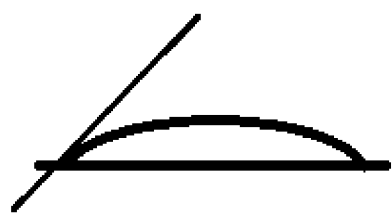
FIG. 1 illustrates an experimental test result.

Embodiments are directed to polymer-film compositions having antioxidant compounds that migrate slowly to a polymer-film surface, the slow migration times thereby lengthening the surface-energy longevity of an oxidized polymer surface.

In embodiments, compounds having the following structures are useful as polymer antioxidants within a polymer film:

STRUCTURE 1

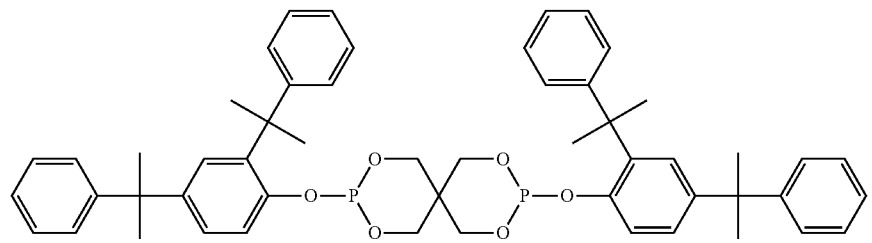

wherein:
  each R is independently selected;
  each R is a $C_{1-20}$ alkyl moiety, $C_{2-22}$ alkenyl moiety, $C_{6-40}$ cycloalkyl moiety, $C_{6-40}$ cycloalkylene moiety, $C_{2-20}$ alkyl glycol ether moiety, $C_{10}$-$C_{16}$ linear alkyl alcohol moiety, or Y—OH moiety;
  each Y is a $C_{2-40}$ alkylene moiety, $C_{7-40}$ cycloalkylene moiety, $C_{2-20}$ alkylene glycol ether, or a $C_{3-40}$ alkylene lactone;
  m is an integer ranging from 1 to 100; and
  x is an integer ranging from 2 to 1,000

STRUCTURE 2

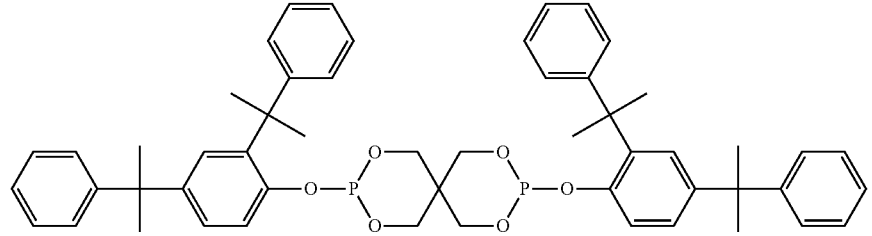

wherein:
  each R is independently selected; and
  each R is a $C_{14}$ or greater alkyl or alkylphenolic moiety

STRUCTURE 3

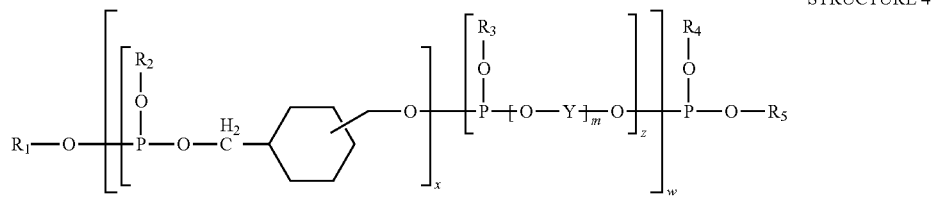

STRUCTURE 4 wherein:

each R is independently selected;

each R is a $C_{1-20}$ alkyl moiety, $C_{2-22}$ alkenyl moiety, $C_{6-40}$ cycloalkyl moiety, $C_{6-40}$ cycloalkylene moiety, $C_{2-20}$ alkyl glycol ether moiety, $C_{10}$-$C_{16}$ linear alkyl alcohol moiety, or Y—OH moiety;

each Y is a $C_{2-40}$ alkylene moiety, $C_{2-40}$ alkylene lactone, $C_{6-40}$ cycloalkylene moiety, $C_{2-20}$ alkylene glycol ethers;

x is an integer ranging from 1 to 1,000;

z is an integer ranging from 0 to 1000;

m is an integer ranging from 1 to 20; and w is an integer ranging from 1 to 1,000.

Chemical structures 1-4 above may be used alone or in any combination within a polymer film.

In embodiments, useful polymer films include polyolefin films. Non-limiting examples of useful polyolefins include: polymers of mono-olefins and diolefins such as polyethylene and polypropylene, high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE) and linear low density polyethylene (LLDPE). Additional non-limiting examples include copolymers of mono-olefins and di-olefins with each other or with other vinyl monomers such as ethylene/propylene, propylene/1-butene, propylene/isobutene, propylene/butadiene, ethylene/1-butene, ethylene/1-hexene, ethylene/1-octene, terpolymers of ethylene, and terpolymers of propylene, and dienes such as hexadiene, dicyclopentadiene, and ethylene-norbornene.

Useful polymer films include those manufactured using any know method. Non-limiting examples include blown films and cast films. Useful films also include those that are stretched in the machine direction, transverse direction, or both; a non-limiting example of a useful polymer film stretched in both the machine and transverse directions is biaxially oriented polypropylene (BOPP).

Films of any thickness can be employed. In embodiments, useful film thicknesses range from 2 microns to 600 microns.

Useful amounts of the anti-oxidant compounds represented by chemical structures 1-4, or combinations thereof, can be determined by those having ordinary skill in the art without having to exercise undue experimentation.

Any known process for oxidizing the surface of a polymer may be used. Non-limiting examples include: corona treatment, plasma treatment, or flame treatment.

Figure 5:
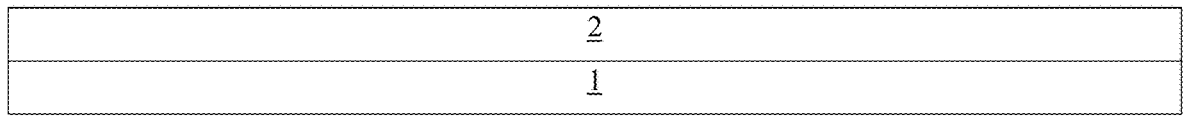
FIG. 5 is a schematic of a composite embodiment.
Figure 6:
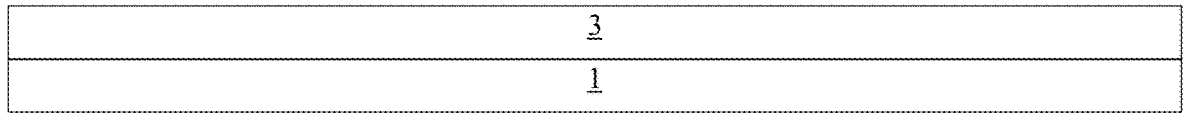
FIG. 6 is a schematic of a composite embodiment.

In embodiments, and as shown schematically in FIG. 5, composite structures have ink layer 2 printed on the surface of an oxidized polymer film 1 (having any combination of STRUCTURES 1-4); any known method for printing on polymer films can be used to produce the composite structure. In additional embodiments, and as shown schematically in FIG. 6, composite structures have metallic layer 3 on the surface of an oxidized polymer film 1 (having any combination of STRUCTURES 1-4); any known method for applying a metallic film to a polymer film may be used to produce the composite structure. As a non-limiting example, methods are known for manufacturing a potato-chip bag having a metallic layer on a polymer film layer, and the polymer-film embodiments can be used in those manufacturing methods.

EXAMPLES

Inventive embodiments were compared with films having known phosphite antioxidants in order to show the relative differences in maintaining surface tension.

Phosphite 1

Phosphite 1 is a known phosphite antioxidant: tris-di-t-butylphenol phosphite:

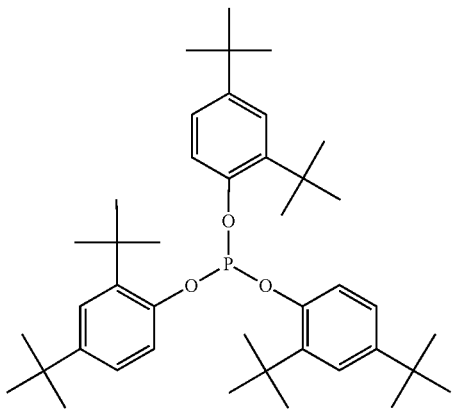 [SMILES: CC(C)(C)c1ccc(OP(Oc2ccc(C(C)(C)C)cc2C(C)(C)C)Oc2ccc(C(C)(C)C)cc2C(C)(C)C)c(C(C)(C)C)c1]

Phosphonite 1

Phosphonite 1 is a blend of the phosphonite and phosphite structures below. 60-65 parts of diphosphonite

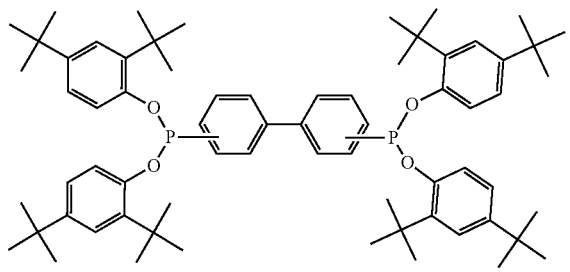

10-15 parts of monophosphonite

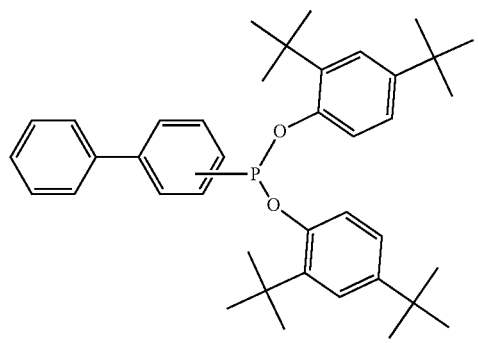

10-15 parts of mono-phosphite

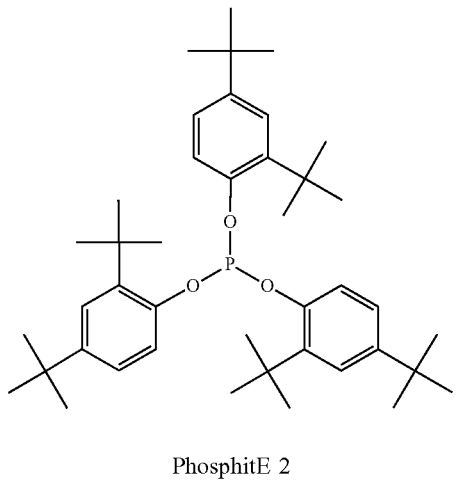

PhosphitE 2

Phosphite 2 is:

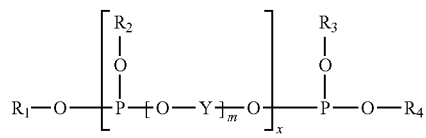

wherein:
each R is independently selected;
each R is $C_{10}$-$C_{16}$ linear alkyl alcohol moiety;
each Y is a $C_3$ alkylene moiety;
m is an integer ranging from 1 to 12; and
x is an integer ranging from 2 to 1,000

Phosphite 3

Phosphite 3 is:

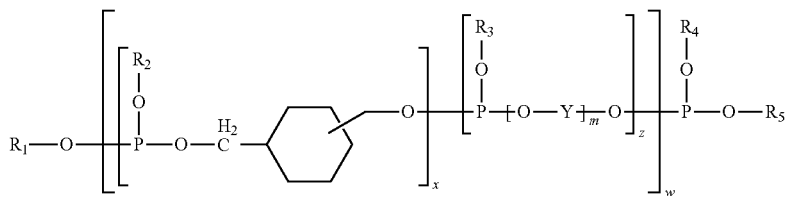

wherein:
each R is independently selected;
each R is a $C_{10}$-$C_{16}$ linear alkyl alcohol moiety;
each Y is a $C_3$ alkylene moiety;
x is an integer ranging from 1 to 1,000;
z is an integer ranging from 0 to 100;
m is an integer ranging from 1 to 12; and
w is an integer ranging from 1 to 1,000.

Example 1 MDO Film

BOPP film-grade polypropylene was stabilized with an antioxidant package containing a primary phenolic antioxidant Dovernox 10 (DN10), a secondary phosphite antioxidant, and a hydrotalcite acid scavenger. The formulations contained in table 1 were dry blended with the polypropylene powder and compounded on a 26 mm twin screw extruder.

TABLE 1

| Formulations | | | | |
|---|---|---|---|---|
| PP | X | X | X | X |
| DN10 | 1000 | 1000 | 1000 | 1000 |
| Hydrotalcite | 200 | 200 | 200 | 200 |
| Phosphonite 1 | 500 | | | |
| Phosphite 1 | | 650 | | |
| Phosphite 2 | | | 650 | |
| Phosphite 3 | | | | 650 |

The formulations of table 1 were compounded at 230 C under nitrogen and pelletized. The compounded pellets were then cast into a 90 micron thick film which was then further Machine Direction Oriented (MDO) stretched into an approximately 20 micron thick film. This film was corona treated on the film line to increase the surface tension.

Surface tension levels were measured and monitored over time using a goniometer. A drop of water was placed on a piece of the film in 5 different locations and the angle of the water droplet was measured as it was sitting on the polymer surface. The 5 measurements were averaged and the average value reported. A low angle measurement indicates a high surface area as the water droplet is attracted to the polar groups on the polymer surface, whereas a high angle measurement indicates that polymer surface is nonpolar and the water is repelled. Untreated polypropylene typically has a measurement of 90 degrees. Surface tension values were measured initially and then measured every several days out to 35 days to monitor the changes in the surface tension and therefore the suitability of the film to be printed on.

Figure 2:
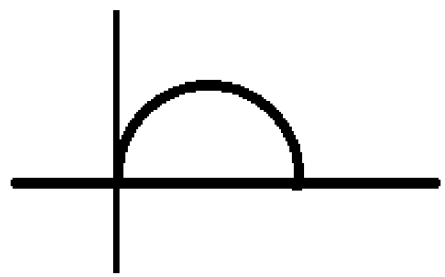
FIG. 2 illustrates an experimental test result.
Figure 3:
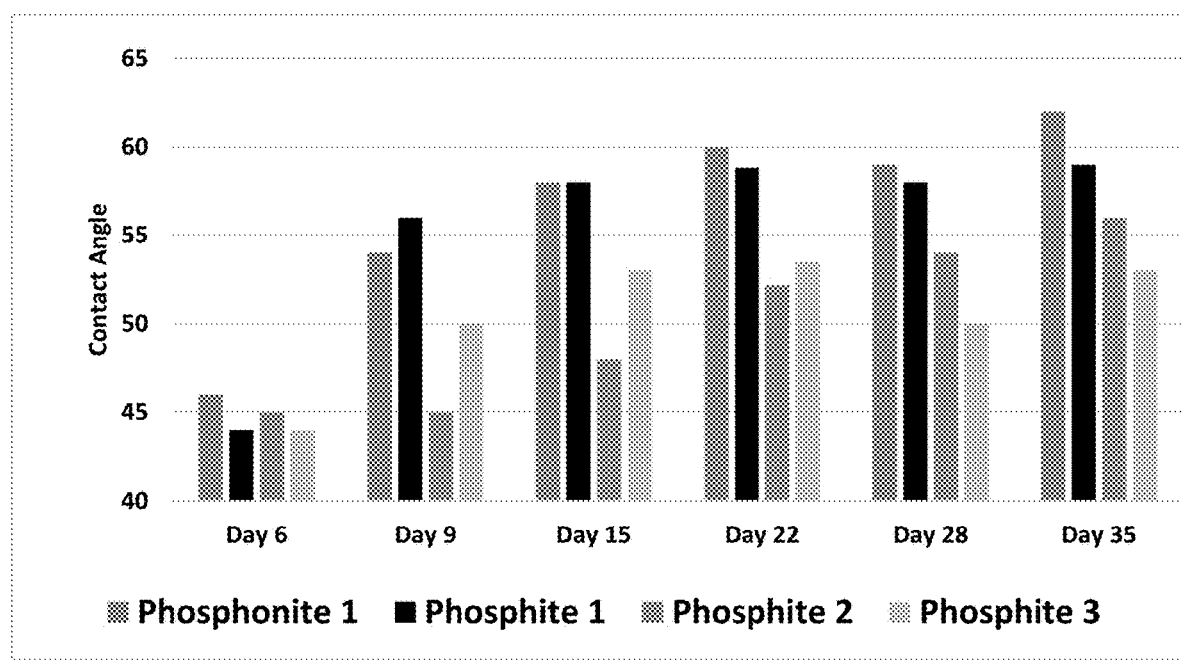
FIG. 3 is a bar graph that illustrates experimental test data.

Treated film with an angle of about 50 degrees is shown in FIG. 1. Untreated film with a 90 degree angle is shown in FIG. 2. Contact-angle results are shown in FIG. 3. As shown in FIG. 3, the formulations containing the phosphites of the current invention, i.e., Phosphites 2 and 3, consistently show lower-contact-angle measurements throughout the 35-day time period, thereby indicating these formulations would be suitable for printing for a longer time period.

Example 2

A second experiment was then carried out where the same films were oven aged to accelerate the loss of surface tension on the surface of the films. On day 35 the contact angle for each film was measured and samples were placed into an 80 C oven and aged for 19 hrs. The films were then removed from the oven and the contact angle for each film was measured after aging. All samples showed a large increase in contact angle under these conditions but the formulations containing the phosphites of the current invention again showed superior performance which indicates the films containing these phosphites would be less sensitive to high storage temperatures and maintain their surface tension for longer periods of time during storage.

| Contact Angle | Phosphonite 1 | Phosphite 1 | Phosphite 2 | Phosphite 3 |
|---|---|---|---|---|
| Before | 64.2 | 65.0 | 55.5 | 54.7 |
| After | 71.4 | 75.4 | 62.4 | 63.4 |

Figure 4:
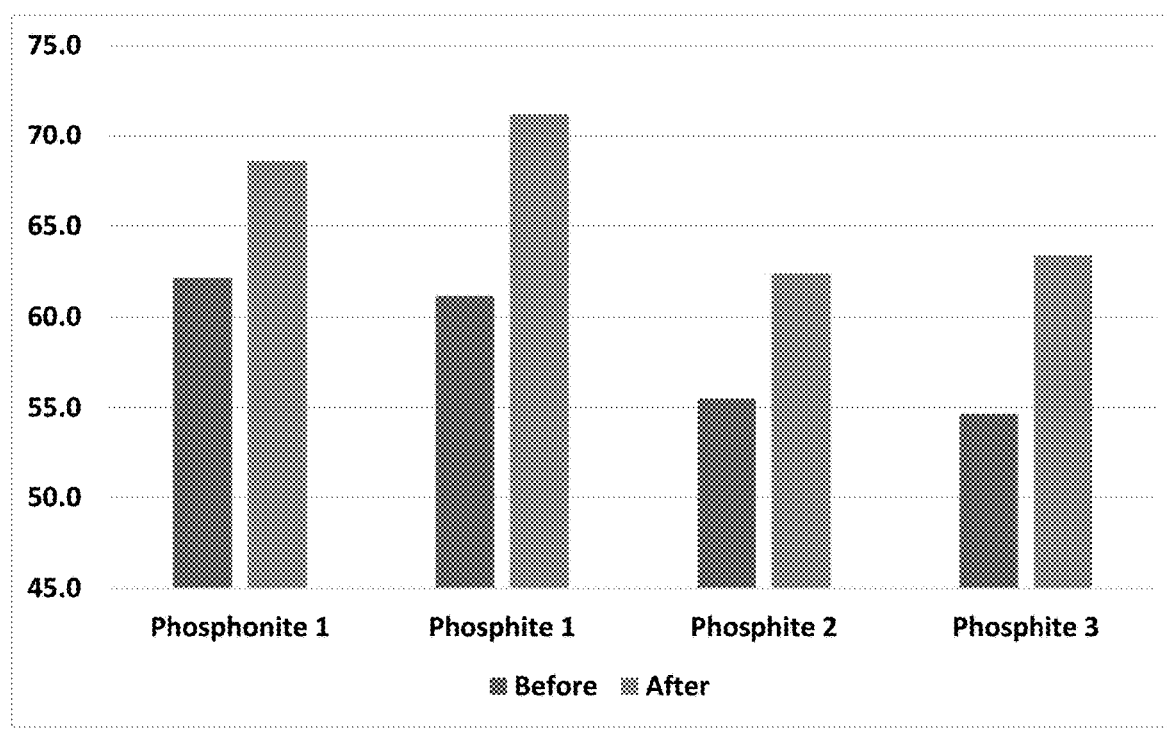
FIG. 4 is a bar graph that illustrates experimental test data.

This is also displayed by the bar graph in FIG. 4.

What is claimed is:

1. A composition comprising:
a polymer-film composition having a compound having the structure:

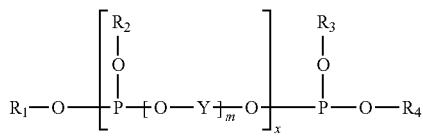

wherein:
each R is independently selected;
each R is a $C_{1-20}$ alkyl moiety, $C_{2-22}$ alkenyl moiety, $C_{6-40}$ cycloalkyl moiety, $C_{6-40}$ cycloalkylene moiety, $C_{2-20}$ alkyl glycol ether moiety, $C_{10}$-$C_{16}$ linear alkyl alcohol moiety, or Y-OH moiety;
each Y is a $C_{2-40}$ alkylene moiety, $C_{6-40}$ cycloalkylene moiety, $C_{2-20}$ alkylene glycol ether, or a $C_{3-40}$ alkylene lactone;
m is an integer ranging from 1 to 100;
x is an integer ranging from 2 to 1,000; and
the polymer-film composition having an oxidized polymer-film surface,
wherein the polymer film has been stretched in both a machine direction and a transverse direction.

2. A composition comprising:
a polymer-film composition having a compound having the structure:

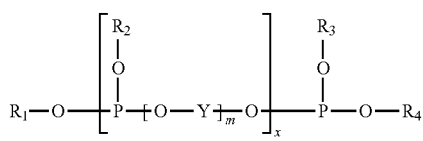

wherein:
each R is independently selected;
each R is a $C_{1-20}$ alkyl moiety, $C_{2-22}$ alkenyl moiety, $C_{6-40}$ cycloalkyl moiety, $C_{6-40}$ cycloalkylene moiety, $C_{2-20}$ alkyl glycol ether moiety, $C_{10}$-$C_{16}$ linear alkyl alcohol moiety, or Y-OH moiety;
each Y is a $C_{2-40}$ alkylene moiety, $C_{6-40}$ cycloalkylene moiety, $C_{2-20}$ alkylene glycol ether, or a $C_{3-40}$ alkylene lactone;
m is an integer ranging from 1 to 100;
x is an integer ranging from 2 to 1,000; and
the polymer-film composition having an oxidized polymer-film surface,
wherein the polymer film has a water-droplet goniometer reading of less than 55 degrees after 28 days.

3. A method comprising the step of:
printing ink on an oxidized polymer-film surface of a polymer-film composition having a compound having the structure:

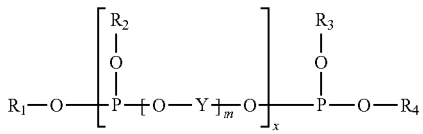

wherein:
each R is independently selected;
each R is a $C_{1-20}$ alkyl moiety, $C_{2-22}$ alkenyl moiety, $C_{6-40}$ cycloalkyl moiety, $C_{6-40}$ cycloalkylene moiety, $C_{2-20}$ alkyl glycol ether moiety, $C_{10}$-$C_{16}$ linear alkyl alcohol moiety, or Y-OH moiety;
each Y is a $C_{2-40}$ alkylene moiety, $C_{6-40}$ cycloalkylene moiety, $C_{2-20}$ alkylene glycol ether, or a $C_{3-40}$ alkylene lactone;
m is an integer ranging from 1 to 100;
x is an integer ranging from 2 to 1,000; and
the polymer-film composition having an oxidized polymer-film surface.

4. A method comprising the step of:
applying a metal to an oxidized polymer-film surface of a polymer-film composition having a compound having the structure:

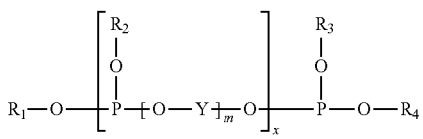

wherein:
each R is independently selected;
each R is a $C_{1-20}$ alkyl moiety, $C_{2-22}$ alkenyl moiety, $C_{6-40}$ cycloalkyl moiety, $C_{6-40}$ cycloalkylene moiety, $C_{2-20}$ alkyl glycol ether moiety, $C_{10}$-$C_{16}$ linear alkyl alcohol moiety, or Y-OH moiety;
each Y is a $C_{2-40}$ alkylene moiety, $C_{6-40}$ cycloalkylene moiety, $C_{2-20}$ alkylene glycol ether, or a $C_{3-40}$ alkylene lactone;
m is an integer ranging from 1 to 100;
x is an integer ranging from 2 to 1,000; and
the polymer-film composition having an oxidized polymer-film surface.

5. A polymer film composition comprising:
a polymer film composition having a compound having the structure:

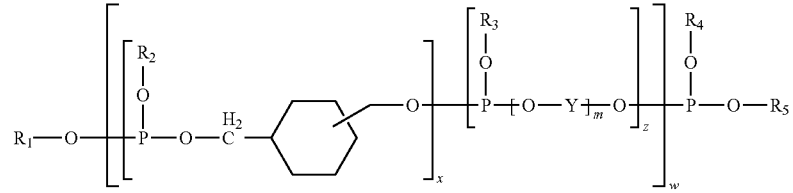

wherein:
  each R is independently selected;
  each R is a $C_{1-20}$ alkyl moiety, $C_{2-22}$ alkenyl moiety, $C_{6-40}$ cycloalkyl moiety, $C_{6-40}$ cycloalkylene moiety, $C_{2-20}$ alkyl glycol ether moiety, $C_{10}$-$C_{16}$ linear alkyl alcohol moiety, or Y-OH moiety;
  each Y is a $C_{2-40}$ alkylene moiety, $C_{2-40}$ alkylene lactone, $C_{6-40}$ cycloalkylene moiety, $C_{2-20}$ alkylene glycol ethers;
  x is an integer ranging from 1 to 1,000;
  z is an integer ranging from 0 to 1,000;
  m is an integer ranging from 1 to 20;
  w is an integer ranging from 1 to 1,000; and
the polymer-film composition having an oxidized polymer-film surface,
wherein the polymer film has been stretched in both a machine direction and a transverse direction.

6. A polymer film composition comprising:
  a polymer film composition having a compound having the structure:

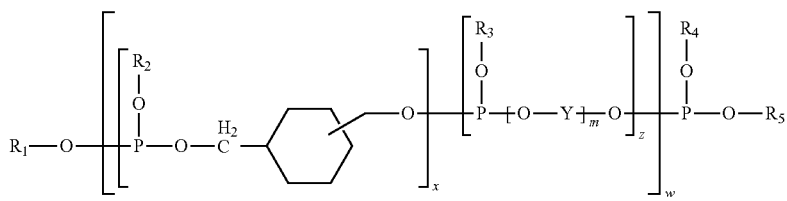

wherein:
  each R is independently selected;
  each R is a $C_{1-20}$ alkyl moiety, $C_{2-22}$ alkenyl moiety, $C_{6-40}$ cycloalkyl moiety, $C_{6-40}$ cycloalkylene moiety, $C_{2-20}$ alkyl glycol ether moiety, $C_{10}$-$C_{16}$ linear alkyl alcohol moiety, or Y-OH moiety;
  each Y is a $C_{2-40}$ alkylene moiety, $C_{2-40}$ alkylene lactone, $C_{6-40}$ cycloalkylene moiety, $C_{2-20}$ alkylene glycol ethers;
  x is an integer ranging from 1 to 1,000;
  z is an integer ranging from 0 to 1000;
  m is an integer ranging from 1 to 20;
  w is an integer ranging from 1 to 1,000; and
  the polymer-film composition having an oxidized polymer-film surface,
  wherein the polymer film has a water-droplet goniometer reading of less than 55 degrees after 28 days.

7. A method comprising the step of:
  printing ink on an oxidized polymer-film surface of a polymer film composition having a compound having the structure:

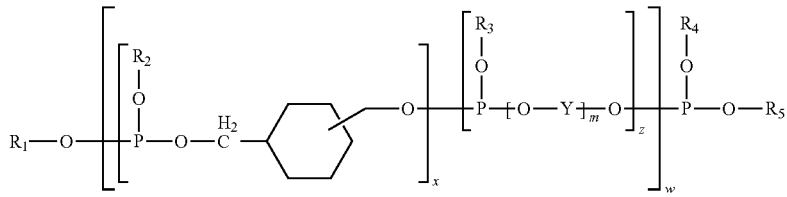

wherein:
  each R is independently selected;
  each R is a $C_{1-20}$ alkyl moiety, $C_{2-22}$ alkenyl moiety, $C_{6-40}$ cycloalkyl moiety, $C_{6-40}$ cycloalkylene moiety, $C_{2-20}$ alkyl glycol ether moiety, $C_{10}$-$C_{16}$ linear alkyl alcohol moiety, or Y-OH moiety;
  each Y is a $C_{2-40}$ alkylene moiety, $C_{2-40}$ alkylene lactone, $C_{6-40}$ cycloalkylene moiety, $C_{2-20}$ alkylene glycol ethers;
  x is an integer ranging from 1 to 1,000;
  z is an integer ranging from 0 to 1000;
  m is an integer ranging from 1 to 20;
  w is an integer ranging from 1 to 1,000; and
  the polymer-film composition having an oxidized polymer-film surface.

8. A method comprising the step of:
applying a metal to an oxidized polymer-film surface of a polymer film composition having a compound having the structure:

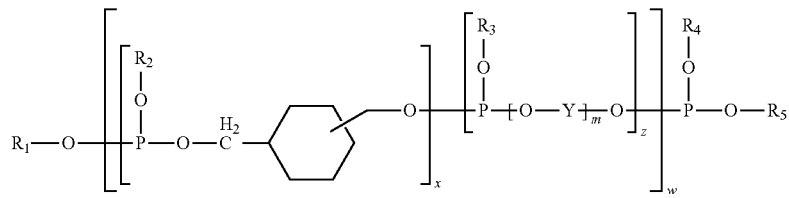

wherein:
each R is independently selected;
each R is a $C_{1-20}$ alkyl moiety, $C_{2-22}$ alkenyl moiety, $C_{6-40}$ cycloalkyl moiety, $C_{6-40}$ cycloalkylene moiety, $C_{2-20}$ alkyl glycol ether moiety, $C_{10}$-$C_{16}$ linear alkyl alcohol moiety, or Y-OH moiety;
each Y is a $C_{2-40}$ alkylene moiety, $C_{2-40}$ alkylene lactone, $C_{6-40}$ cycloalkylene moiety, $C_{2-20}$ alkylene glycol ethers;
x is an integer ranging from 1 to 1,000;
z is an integer ranging from 0 to 1000;
m is an integer ranging from 1 to 20;
w is an integer ranging from 1 to 1,000; and
the polymer-film composition having an oxidized polymer-film surface.

9. A method comprising the step of:
printing ink on an oxidized polymer-film surface of a polymer-film composition having a first compound and a second compound, the first compound having the structure:

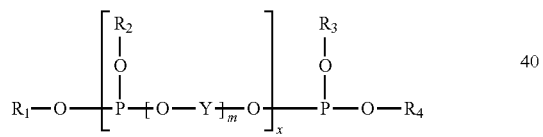

wherein:
each R is independently selected;
each R is a $C_{1-20}$ alkyl moiety, $C_{2-22}$ alkenyl moiety, $C_{6-40}$ cycloalkyl moiety, $C_{6-40}$ cycloalkylene moiety, $C_{2-20}$ alkyl glycol ether moiety, $C_{10}$-$C_{16}$ linear alkyl alcohol moiety, or Y-OH moiety ;
each Y is a $C_{2-40}$ alkylene moiety, $C_{6-40}$ cycloalkylene moiety, $C_{2-20}$ alkylene glycol ether, or $C_{3-40}$ alkylene lactone;
m is an integer ranging from 1 to 100;
x is an integer ranging from 2 to 1,000;
and the second compound having the structure:

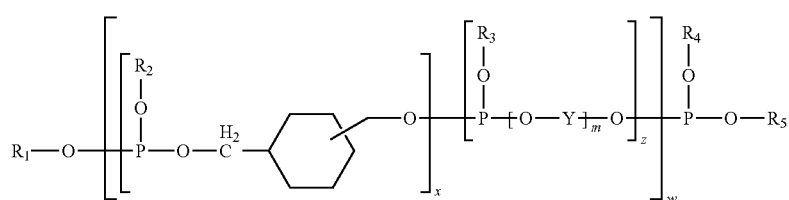

wherein:
each R is independently selected;
each R is a $C_{10-20}$ alkyl moiety, $C_{2-22}$ alkenyl moiety, $C_{6-40}$ cycloalkyl moiety, $C_{6-40}$ cycloalkylene moiety, $C_{2-20}$ alkyl glycol ether moiety, $C_{10}$-$C_{16}$ linear alkyl alcohol moiety, or Y-OH moiety;
each Y is a $C_{2-40}$ alkylene moiety, $C_{2-40}$ alkylene lactone, $C_{6-40}$ cycloalkylene moiety, or $C_{2-20}$ alkylene glycol ether;
x is an integer ranging from 1 to 1,000;
z is an integer ranging from 0 to 1000;
m is an integer ranging from 1 to 20;
w is an integer ranging from 1 to 1,000; and
the polymer-film composition having an oxidized polymer-film surface.

10. A method comprising the step of:
applying a metal to an oxidized polymer-film surface of a polymer-film composition having a first compound and a second compound, the first compound having the structure:

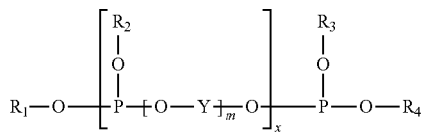

wherein:
each R is independently selected;
each R is a $C_{1-20}$ alkyl moiety, $C_{2-22}$ alkenyl moiety, $C_{6-40}$ cycloalkyl moiety, $C_{6-40}$ cycloalkylene moiety, $C_{2-20}$ alkyl glycol ether moiety, $C_{10}$-$C_{16}$ linear alkyl alcohol moiety, or Y-OH moiety ;
each Y is a $C_{2-40}$ alkylene moiety, $C_{6-40}$ cycloalkylene moiety, $C_{2-20}$ alkylene glycol ether, or $C_{3-40}$ alkylene lactone;
m is an integer ranging from 1 to 100;
x is an integer ranging from 2 to 1,000;

and the second compound having the structure:

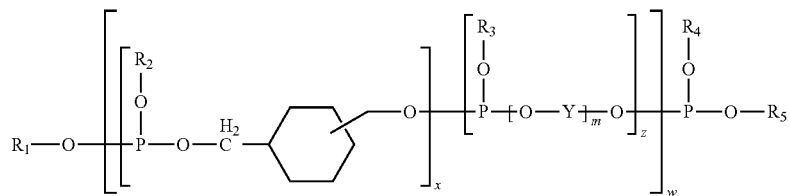

wherein:
  each R is independently selected;
  each R is a $C_{1-20}$ alkyl moiety, $C_{2-22}$ alkenyl moiety, $C_{6-40}$ cycloalkyl moiety, $C_{6-40}$ cycloalkylene moiety, $C_{2-20}$ alkyl glycol ether moiety, $C_{10}$-$C_{16}$ linear alkyl alcohol moiety, or Y-OH moiety;
  each Y is a $C_{2-40}$ alkylene moiety, $C_{2-40}$ alkylene lactone, $C_{6-40}$ cycloalkylene moiety, or $C_{2-20}$ alkylene glycol ether;

x is an integer ranging from 1 to 1,000;
z is an integer ranging from 0 to 1000;
m is an integer ranging from 1 to 20;
w is an integer ranging from 1 to 1,000; and
the polymer-film composition having an oxidized polymer-film surface.

* * * * *